(12) United States Patent
Davies et al.

(10) Patent No.: US 9,046,191 B2
(45) Date of Patent: Jun. 2, 2015

(54) VALVE BODY WITH UPPER FLOW DIVERTER

(75) Inventors: Lonnie O. Davies, Marshalltown, IA (US); Jeremy R. Hilsabeck, Marshalltown, IA (US); Chad M. Engle, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 217 days.

(21) Appl. No.: 13/599,474

(22) Filed: Aug. 30, 2012

(65) Prior Publication Data
US 2014/0061528 A1 Mar. 6, 2014

(51) Int. Cl.
*F16K 47/08* (2006.01)
*F16K 47/00* (2006.01)
*F16K 27/04* (2006.01)

(52) U.S. Cl.
CPC .............. *F16K 47/00* (2013.01); *F16K 27/041* (2013.01); *F16K 47/08* (2013.01)

(58) Field of Classification Search
CPC ......... F16K 27/00; F16K 47/04; F16K 47/08; F16K 47/16
USPC .............................................. 137/625.3, 561
See application file for complete search history.

(56) References Cited

U.S. PATENT DOCUMENTS

| 3,648,718 | A |   | 3/1972  | Curran |           |
|-----------|---|---|---------|--------|-----------|
| 3,762,685 | A |   | 10/1973 | Curran |           |
| 3,776,278 | A |   | 12/1973 | Allen  |           |
| 4,024,891 | A |   | 5/1977  | Engel et al. |     |
| 4,384,592 | A |   | 5/1983  | Ng     |           |
| 4,529,518 | A | * | 7/1985  | Jackson | ......................... 210/407 |
| 4,617,963 | A |   | 10/1986 | Stares |           |
| 4,825,906 | A | * | 5/1989  | Hartman | ..................... 137/625.3 |
| 5,381,818 | A |   | 1/1995  | Nendzig et al. |   |

(Continued)

FOREIGN PATENT DOCUMENTS

DE 195 158 C 11/1906
DE 1 053 263 B 3/1959

(Continued)

OTHER PUBLICATIONS

International Search Report and Written Opinion for Application No. PCT/US2013/056960, dated Dec. 6, 2013.

(Continued)

*Primary Examiner* — Craig Schneider
*Assistant Examiner* — Kelsey Rohman
(74) *Attorney, Agent, or Firm* — Marshall, Gerstein & Borun LLP

(57) ABSTRACT

A valve body includes a first opening, a second opening, a gallery, a first flow conduit portion, a second flow conduit portion, and an upper flow diverter. The gallery is disposed between the first and second openings. The first flow conduit portion extends between the first opening and a side opening of the gallery. The second flow conduit portion extends between the second opening and a bottom opening of the gallery. The upper flow diverter is carried by an upper wall portion of the first flow conduit portion and extends into the first flow conduit portion. In one version, the upper flow diverter includes an elongated structure extending at least partially between the first opening and the gallery for diverting the fluid flowing through the first flow conduit portion and into the gallery.

22 Claims, 3 Drawing Sheets

(56) References Cited

U.S. PATENT DOCUMENTS

| | | |
|---|---|---|
| 7,104,281 B2 | 9/2006 | Stares et al. |
| 7,448,409 B2 | 11/2008 | Micheel et al. |
| 7,789,105 B2 | 9/2010 | Zecchi et al. |
| 2009/0179163 A1 | 7/2009 | Fleming |
| 2010/0307610 A1 | 12/2010 | Wears |
| 2010/0326533 A1 | 12/2010 | Mooney et al. |

FOREIGN PATENT DOCUMENTS

| | | |
|---|---|---|
| DE | 35 19 916 A1 | 12/1986 |
| EP | 0 072 170 A1 | 2/1983 |
| JP | 60-201181 | 10/1985 |

OTHER PUBLICATIONS

International Search Report and Written Opinion for Application No. PCT/US2013/056968, dated Dec. 5, 2013.
International Preliminary Report on Patentability for Application No. PCT/US2013/056968, dated Mar. 3, 2015.
International Preliminary Report on Patentability for Application No. PCT/US2013/056960, dated Mar. 3, 2015.

* cited by examiner

VALVE BODY WITH UPPER FLOW DIVERTER

FIELD OF THE DISCLOSURE

The present disclosure is related to fluid flow control devices and, more particularly, to valve bodies for fluid flow control devices.

BACKGROUND

Conventional fluid flow control devices include valve bodies defining inlet and outlet flow paths that meet at a gallery, which accommodates a trim assembly for controlling the flow of fluid through the device. In a sliding stem style fluid flow control device, the trim assembly conventionally includes a sliding stem control element movably disposed in a cage for selectively seating against a seat ring. The cage includes a hollow cylindrical member for guiding the control element, and which defines a plurality of openings to allow for fluid to pass through the gallery. Depending on the particular geometry of the valve body walls and the cage, this conventional configuration does not necessarily allow for the most efficient movement of fluid.

SUMMARY

One aspect of the present disclosure provides a valve body including a first opening, a second opening, a gallery, a first flow conduit portion, a second flow conduit portion, and an upper flow diverter. The gallery is disposed between the first and second openings. The first flow conduit portion extends between the first opening and a side opening of the gallery. The second flow conduit portion extends between the second opening and a bottom opening of the gallery. The upper flow diverter is carried by an upper wall portion of the first flow conduit portion and extends into the first flow conduit portion. In one version, the upper flow diverter includes an elongated structure extending at least partially between the first opening and the gallery for diverting the fluid flowing through the first flow conduit portion and into the gallery.

DETAILED DESCRIPTION

Figure 1:
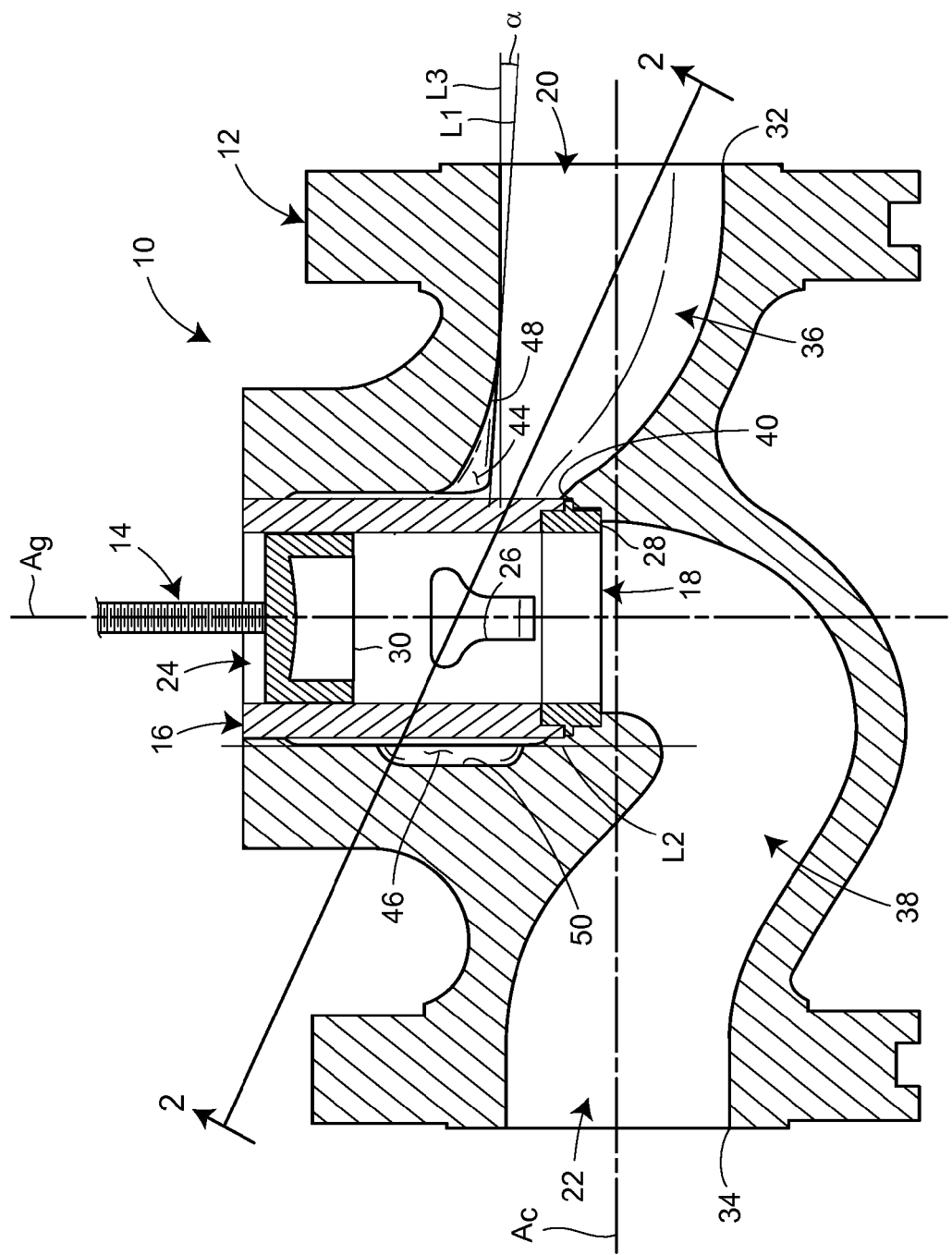
FIG. 1 is a cross-sectional side view of one version of a fluid flow control device constructed in accordance with the present disclosure.

FIG. 1 depicts a fluid flow control device 10 constructed in accordance with the present disclosure and including a valve body 12, a control element 14, a cage 16, and a seat ring 18. The valve body 12 includes an inlet 20, an outlet 22, and a gallery 24 disposed between the inlet 20 and the outlet 22. The cage 16 and the seat ring 18 are fixed in the gallery 24, and the control element 14 is slidably disposed in the cage 16 for controlling the flow of fluid through the valve body 14 in a conventional manner. More specifically, the cage 16 includes a hollow cylindrical member defining a plurality of openings 26, only one of which is depicted in FIG. 1, for allowing fluid to pass through the cage 16. The seat ring 18 is sandwiched between a bottom end of the cage 14 and a shoulder 28 of the valve body 12. So positioned, the seat ring 18 is adapted to be selectively engaged by an end surface 30 of the control element 14, when the control element 14 occupies a closed position, for preventing fluid flow between the inlet 20 and the outlet 22. While the depicted fluid flow control device 10 includes the cage 16, this is just one example, and other fluid flow control devices within the scope of the present disclosure do not necessarily require cages.

With continued reference to FIG. 1, in addition to the inlet 20, the outlet 22, and the gallery 24, the valve body 12 of the present disclosure includes a first opening 32, a second opening 34, a first flow conduit portion 36, and a second flow conduit portion 38. In the depicted version, the first and second openings 32, 34 can be flanged openings for connecting in a pipeline, but other versions may offer openings adapted for weld ends or openings adapted for other types of connections. The gallery 24 includes a generally cylindrical space extending vertically along a gallery axis Ag that is generally located in a center portion of the valve body 12 between the inlet 20 and the outlet 22. In the disclosed version, the first opening 32 is arranged at the inlet 20 of the valve body 12 and the first flow conduit portion 36 extends between the first opening 20 and a side opening 40 of the gallery 24. Moreover, the second opening 34 is arranged at the outlet 22 of the valve body 12 and the second flow conduit portion 38 extends between the second opening 34 and a bottom opening 42 of the gallery 24. The first and second openings 32, 34 are disposed along a common central axis Ac of the valve body 12 and configured to couple the fluid flow control device 10 into a pipeline, for example, in a conventional manner such that fluid can flow between the inlet 20 and the outlet 22. In the disclosed version of the fluid flow control device 10, the central axis Ac of the valve body 12 is perpendicular to the gallery axis Ag.

In addition to the foregoing, and as will be described in more detail below, the valve body 12 further includes an upper flow diverter 44 and a rear flow diverter 46. The upper flow diverter 44 is disposed in the first flow conduit portion 36 and configured for splitting the flow of fluid around the gallery 24 and the optional cage 16 as it travels from the first flow conduit portion 36 and through the side opening 40 of the gallery 24. The rear flow diverter 46 is disposed in the gallery 24 and configured for forcing fluid flowing around the gallery 24 toward the bottom opening 42 of the gallery 24. In the disclosed version, the upper and rear flow diverters 44, 46 are formed integrally with the valve body 12, whether it be through casting, machining, forging, or any other manufacturing process. That is, the valve body 12 and the diverters 44, 46 are one piece. Other versions could be constructed differently. While the disclosed valve body 12 includes both the upper flow diverter 44 and the rear flow diverter 46, the rear flow diverter 46 is optional and the valve body 12 could be constructed with only the upper flow diverter 44.

Still referring to FIG. 1, the first flow conduit portion 36 and the second flow conduit portion 38 include elongated spaces defining fluid pathways that can have varying circular and/or elliptical cross-sections, for example, for allowing fluid to flow therethrough. Moreover, as mentioned, the gallery 24 can include a generally cylindrical space positioned generally vertically between and in fluid communication with the first and second flow conduit portions 36, 38. For the sake of description, the first flow conduit portion 36 includes an upper wall portion 48 that carries the upper flow diverter 44, and the gallery 24 includes a rear wall portion 50 that carries the optional rear flow diverter 46. The rear wall portion 50 of the gallery 24 is located opposite the gallery 24 from the first flow conduit portion 36 and the side opening 40, and therefore, this portion of the gallery wall can be referred to as being located at the "rear" of the gallery 24.

Figure 2:
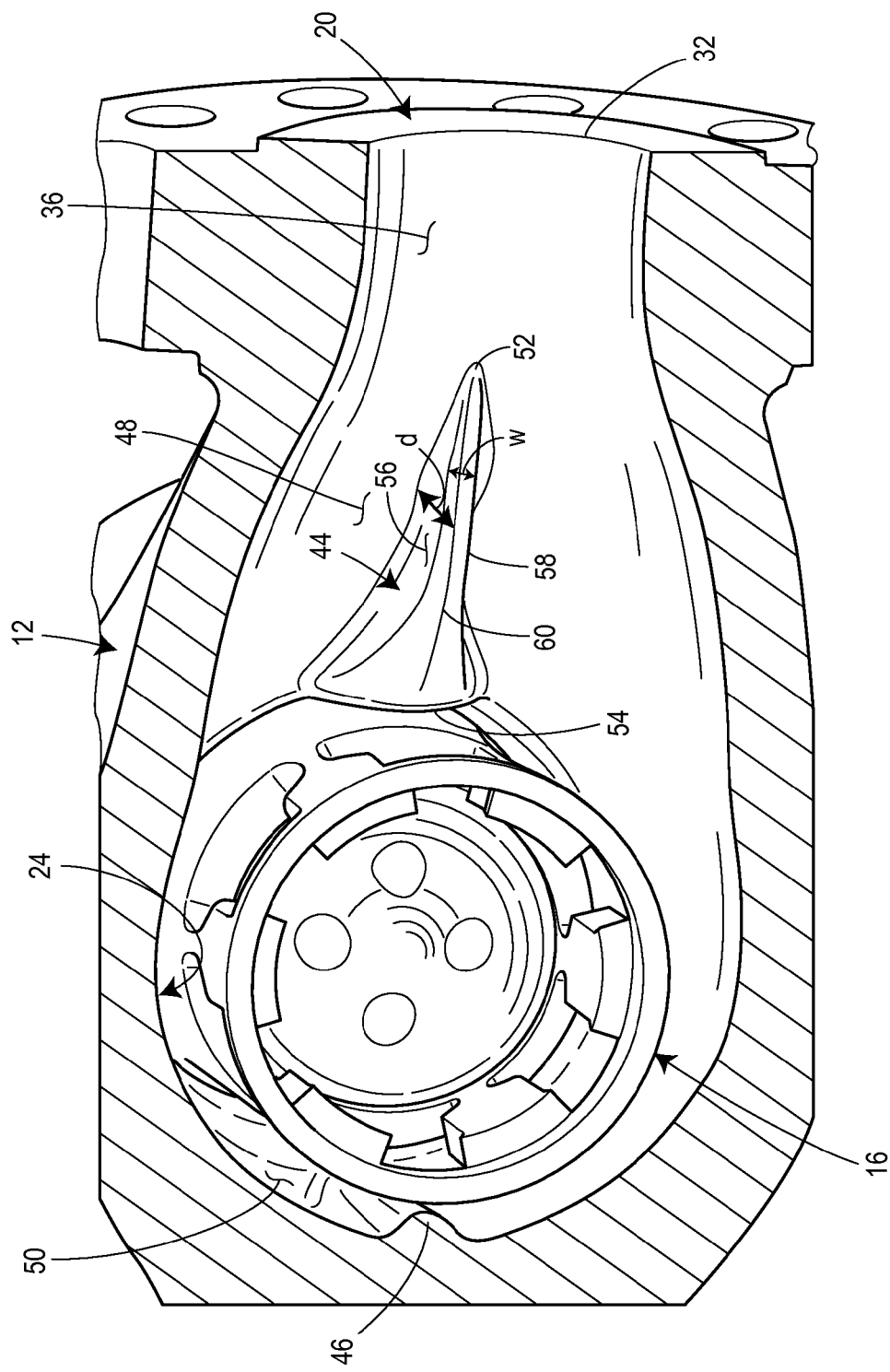
FIG. 2 is a partial cross-sectional view of the valve body of FIG. 1 taken through line 2-2 including a detail view of an upper flow diverter of the present disclosure.

As can be seen in FIG. 1, the rear flow diverter 46 extends away from the rear wall portion 50 of the gallery 24 and into the gallery 24 toward the gallery axis Ag, the side opening 40, and the first flow conduit portion 36. Moreover, as shown, the rear flow diverter 46 includes an elongated structure extending along a line L2 that is parallel to the gallery axis Ag, perpendicular to the central axis Ac of the valve body 12, and transverse to a line L1, along which the upper flow diverter 44 extends. As shown in FIG. 2, the rear flow diverter 46 includes an outwardly curved cross-sectional profile of generally uniform dimension, thereby resembling a vertical fin extending from the rear wall portion 50 of the gallery 24 having a bull-nosed type surface. Other versions of the rear flow diverter 46 can have different geometries.

Still referring to FIG. 2, the upper flow diverter 44 of the presently disclosed valve body 12 includes a first end 52 spaced away from the gallery 24, and a second end 54 disposed adjacent to the gallery 24. The upper flow diverter 44 is generally wedge-shaped and includes opposing sidewall surfaces 56, 58 and a ridge 60. As shown in FIG. 1, the ridge extends along the line L1, which extends at an angle $\alpha$ relative to the central axis Ac of the valve body 12. In the disclosed version, the angle $\alpha$ can be in a range of approximately 0 degrees to approximately 15 degrees, or even more, depending on the desired operational characteristics of the valve body 12. When the angle $\alpha$ is greater than 0, as depicted, the ridge 60 is disposed such that second end 54 of the upper flow diverter 44 is disposed further away from the central axis Ac of the valve body 12 than the first end 52. In fact, the angle $\alpha$ can even be negative, if desired, such that the second end 54 of the upper flow diverter 44 extends closer to the central axis Ac than the first end 52.

Figure 3:
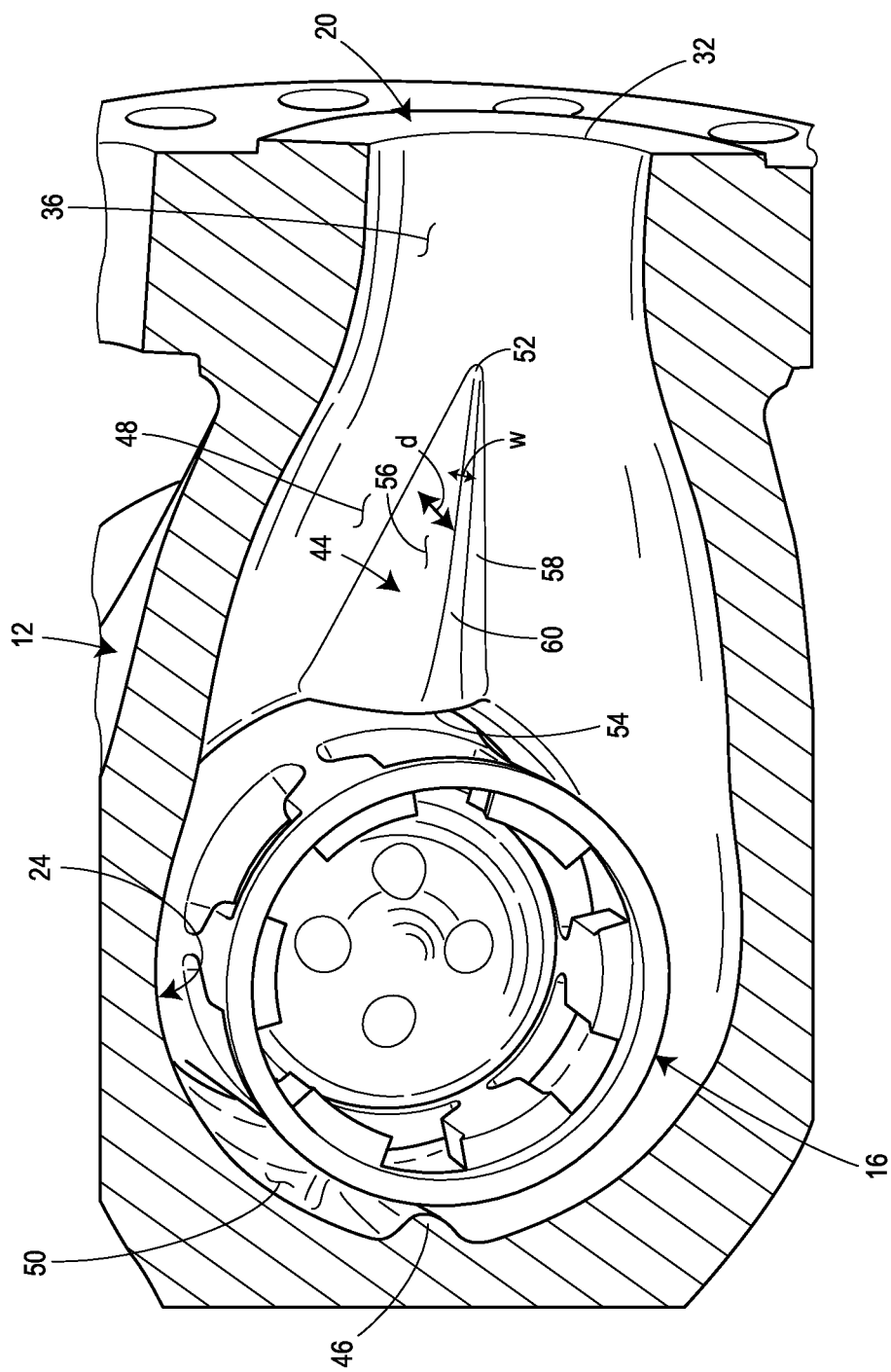
FIG. 3 is a partial cross-sectional view of the valve body of FIG. 1 taken through line 2-2 including a detail view of an alternative upper flow diverter of the present disclosure.

Continuing to refer to FIG. 2, the sidewall surfaces 56, 58 of the upper flow diverter 44 extend downward and away from the upper wall portion 48 of the first flow conduit 36 and terminate at the ridge 60. Depending on the desired operational characteristics of the valve body 12, the ridge 60 can include a sharp peak defined by a direct intersection of the opposing sidewall surfaces 56, 58. Alternatively, the ridge 60 can have a radiused profile, or some other geometry. That is, the ridge 60 can have a bull-nose type finish or other contour suitable for achieving the intended objectives of the disclosure. So configured, a cross-section of the upper flow diverter 44 can be generally triangular in at least one version of the valve body 12. Additionally, in the disclosed version, the sidewall surfaces 56, 58 are at least partially curved inwardly toward each other, but they can also be at least partially planar (see, e.g., FIG. 3), or at least partially curved outward away from each other, depending on the particular application and the desired flow splitting characteristics.

As illustrated, a width dimension W (i.e., a maximum distance between the sidewall surfaces 56, 68) of the upper flow diverter 44 increases from the first end 52 to the second end 54, and a depth dimension d (i.e., a distance between the upper wall portion 48 and the ridge 60) expands from the first end 52 to the second end 54. Thus, the geometry of the disclosed upper flow diverter 44 diverges from the first end 52 to the second end 54 such that it is narrower on the first end 52, which is closer to the first opening 32 of the inlet 20, which supplies the fluid in the disclosed configuration. In versions where the sidewall surfaces 56, 58 of the upper flow diverter 44 are at least partially planar surfaces (FIG. 3), it can be said that the width dimension W diverges uniformly from the first end 52 to the second end 54. In versions where the sidewall surfaces 56, 58 are at least partially non-planar surfaces (e.g., inwardly or outwardly curving), it can be said that the width dimension W diverges non-uniformly from the first end 52 to the second end 54.

With the valve body 12 configured as described, the upper flow diverter 44 advantageously splits fluid flowing from the inlet 20 to the gallery 24 as it passes from the first flow conduit portion 36 through the side opening 40 of the gallery 24. The upper flow diverter 44 splits the fluid around the gallery 24, and around the optional cage 16 when included, along the wall of the gallery 24 and as it reaches the rear wall portion 50 of the gallery 24, the rear flow diverter 46 directs the fluid flow toward the bottom opening 42 of the gallery 24 and out to the second flow conduit portion 38. The upper flow diverter 44 of the present disclosure therefore advantageously increases flow path efficiency from the inlet 20 to the gallery 24, which further evenly distributes the flow around the gallery 24, and the optional cage 16 when included, toward the rear wall portion 50 and, in versions that include the optional rear flow diverter 46, toward the rear flow diverter 46. This results in the minimizing of turbulence in the gallery 24 and the openings 26 in the optional cage 16, when included, are used to their full potential. Further still, this reduces pressure variances around the circumference of the optional cage 16, which increases capacity and overall desirable performance. Thus, from the foregoing, the upper flow diverter 44 of the valve body 12 can be described as being a means for splitting the fluid around the gallery 24 as the fluid enters the gallery 24 from the first flow conduit portion 36 through the side opening 40. Additionally, the rear flow diverter 46 can be described as a means for forcing the fluid coming around the gallery 24 toward the bottom opening 42 of the gallery 24.

The foregoing description is provided as an example of embodying the present invention but is not intended to limit the scope of the invention. The scope of the invention is defined by the following claims and includes all equivalents thereof that fall within the spirit and scope of the claims and the disclosure as a whole.

What is claimed is:
1. A valve body comprising:
a first opening;
a second opening;
a gallery disposed between the first and second openings for accommodating a trim assembly;
a first flow conduit portion extending between the first opening and a side opening of the gallery;
a second flow conduit portion extending between the second opening and a bottom opening of the gallery;
an upper flow diverter carried by an upper wall portion of the first flow conduit portion and extending into the first flow conduit portion, the upper flow diverter comprising an elongated structure extending at least partially between the first opening and the gallery for diverting the fluid flowing through the first flow conduit portion and into the gallery,
wherein the upper flow diverter includes sidewall surfaces converging to a ridge disposed along a direction that is aligned with a flow of fluid through the first flow conduit portion; and
a rear flow diverter carried by a rear wall portion of the gallery and extending into the gallery, the rear wall portion of the gallery disposed opposite the gallery from the first flow conduit portion, the rear gallery diverter comprising an elongated structure extending in a direction transverse to the upper flow diverter and for diverting fluid flowing in the gallery toward the bottom opening of the gallery, wherein the rear flow diverter converges away from the rear wall portion of the gallery in a direction extending transverse to a central axis of the gallery.

2. The valve body of claim 1, wherein the sidewall surfaces are planar surfaces.

3. The valve body of claim 1, wherein the sidewall surfaces are at least partially inwardly curved toward each other.

4. The valve body of claim 1, wherein the ridge comprises an outwardly radiused profile.

5. The valve body of claim 1, wherein the upper flow diverter includes a first end spaced away from the gallery and a second end disposed adjacent to the gallery, and wherein the upper flow diverter includes a width dimension that increases from the first end to the second end.

6. The valve body of claim 5, wherein the width dimension of the upper flow diverter diverges uniformly from the first end to the second end.

7. The valve body of claim 5, wherein the width dimension of the upper flow diverter diverges non-uniformly from the first end to the second end.

8. The valve body of claim 5, wherein the upper flow conduit portion includes a depth dimension that expands from the first end to the second end.

9. The valve body of claim 1, wherein the ridge extends along a line.

10. The device of claim 9, wherein the line extends at an angle relative to a common central axis that extends through the first and second openings of the valve body, the angle being in a range of approximately 0 degrees to approximately 15 degrees.

11. A valve body, comprising:
a first opening;
a second opening;
a gallery disposed between the first and second openings, the gallery comprising a cylindrical space;
a first flow conduit portion extending between the first opening and a side opening of the gallery;
a second flow conduit portion extending between the second opening and a bottom opening of the gallery;
a means for splitting the fluid around the gallery as the fluid enters the gallery from the first flow conduit portion through the side opening, wherein the means for splitting includes sidewall surfaces converging to a ridge disposed along a direction that is aligned with a flow of fluid through the first flow conduit portion; and
a means for forcing the fluid coming around the gallery toward the bottom opening of the gallery, wherein the means for forcing includes a rear flow diverter that converges away from a rear wall portion of the gallery in a direction extending transverse to a central axis of the gallery.

12. The device of claim 11, wherein the ridge forms a line that extends at an angle relative to a common central axis of the valve body, the common central axis extending through the first and second openings and the angle being in a range of approximately 0 degrees to approximately 15 degrees.

13. A fluid flow control device, comprising:
a valve body comprising a first opening, a second opening, a gallery disposed between the first and second openings, a first flow conduit portion extending between the first opening and a side opening of the gallery, a second flow conduit portion extending between the second opening and a bottom opening of the gallery, and an upper flow diverter carried by an upper wall portion of the first flow conduit portion and extending into the first flow conduit portion;
a control element movably disposed in the gallery for controlling the flow of fluid through the valve body,
the upper flow diverter of the valve body comprising an elongated structure extending at least partially between the first opening and the gallery for diverting the fluid flowing through the first flow conduit portion and into and around the gallery,
wherein the upper flow diverter includes sidewall surfaces converging to a ridge disposed along a direction that is aligned with a flow of fluid through the first flow conduit portion; and
a rear flow diverter carried by a rear wall of the gallery and extending into the gallery, the rear wall portion of the gallery disposed opposite the gallery from the first flow conduit portion, the rear gallery diverter comprising an elongated structure extending in a direction transverse to the upper flow diverter and for diverting fluid flowing in the gallery toward the bottom opening of the gallery,
wherein the rear flow diverter converges away from the rear wall portion of the gallery in a direction extending transverse to a central axis of the gallery.

14. The device of claim 13, wherein the sidewall surfaces are planar surfaces.

15. The device of claim 13, wherein the sidewall surfaces are at least partially inwardly curved toward each other.

16. The device of claim 13, wherein the ridge comprises an outwardly radiused profile.

17. The device of claim 13, wherein the upper flow conduit portion includes a depth dimension that expands from the first end to the second end.

18. The device of claim 13, wherein the upper flow diverter includes a first end spaced away from the gallery and a second end disposed adjacent to the gallery, and wherein the upper flow diverter includes a width dimension that increases from the first end to the second end.

19. The device of claim 18, wherein the width dimension of the upper flow diverter diverges uniformly from the first end to the second end.

20. The device of claim 18, wherein the width dimension of the upper flow diverter diverges non-uniformly from the first end to the second end.

21. The device of claim 13, wherein the ridge extends along a line.

22. The device of claim 21, wherein the line extends at an angle relative to a common central axis that extends through the first and second openings of the valve body, the angle being in a range of approximately 0 degrees to approximately 15 degrees.

* * * * *